E. E. WICKERSHAM.
TRACTOR FRAME SUSPENSION.
APPLICATION FILED MAY 26, 1920.
1,407,973.
Patented Feb. 28, 1922.
2 SHEETS—SHEET 1.
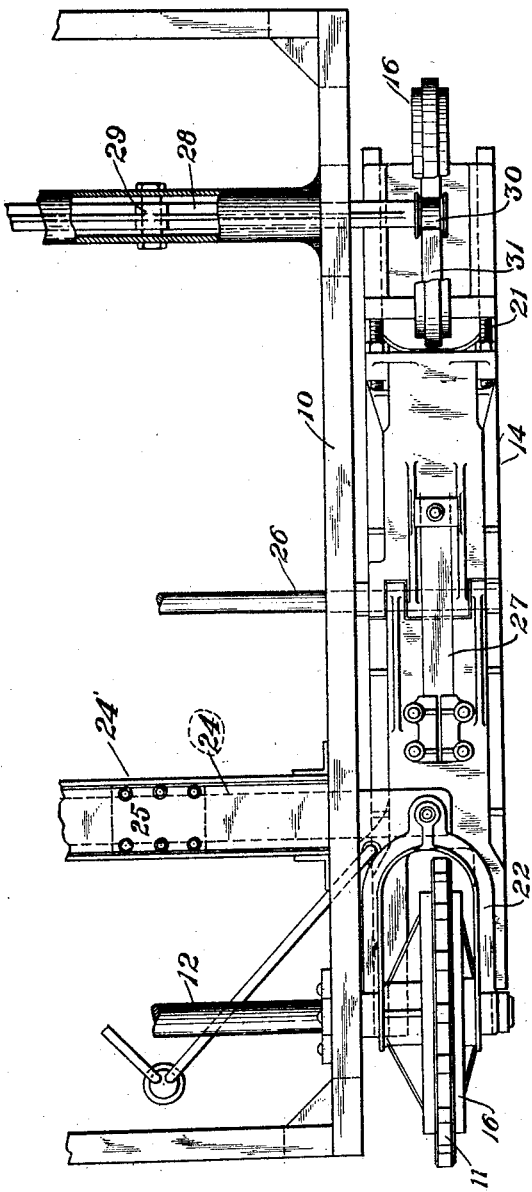
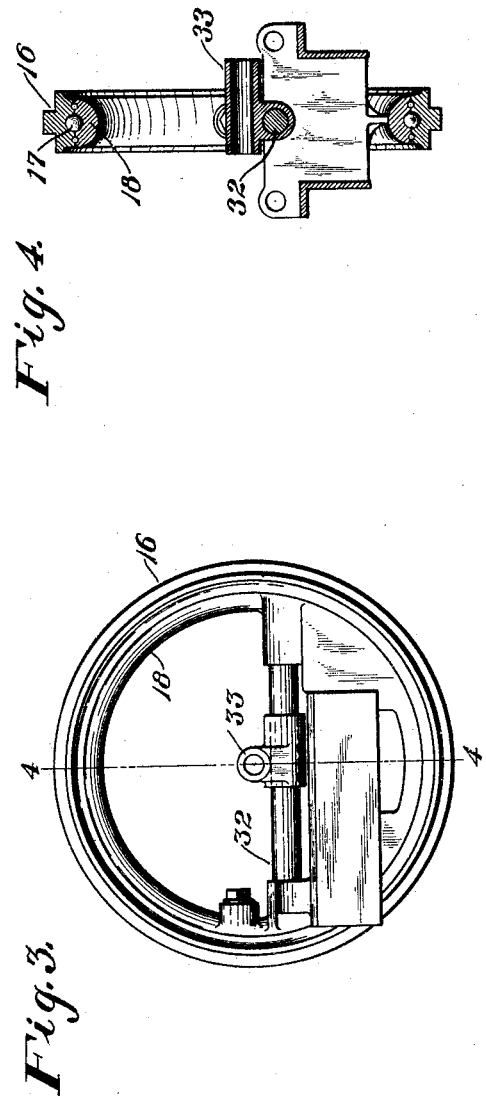
INVENTOR.
Elmer E. Wickersham.
BY Chas. E. Townsend
ATTORNEY

E. E. WICKERSHAM.
TRACTOR FRAME SUSPENSION.
APPLICATION FILED MAY 26, 1920.

1,407,973.

Patented Feb. 28, 1922.
2 SHEETS—SHEET 2.

INVENTOR.
Elmer E. Wickersham.
BY Chas E. Townsend
ATTORNEY.

UNITED STATES PATENT OFFICE.

ELMER E. WICKERSHAM, OF STOCKTON, CALIFORNIA, ASSIGNOR TO THE HOLT MANUFACTURING COMPANY, OF STOCKTON, CALIFORNIA, A CORPORATION OF CALIFORNIA.

TRACTOR-FRAME SUSPENSION.

1,407,973.   Specification of Letters Patent.   Patented Feb. 28, 1922.

Application filed May 26, 1920. Serial No. 384,348.

*To all whom it may concern:*

Be it known that I, ELMER E. WICKERSHAM, a citizen of the United States, residing at Stockton, in the county of San Joaquin and State of California, have invented a new and useful Improvement in Tractor-Frame Suspensions, of which the following is a specification.

This invention relates to tractors of the self-laying track type and more particularly to a novel suspension for the main frame.

The object is to improve and simplify the operation and construction of the means for suspending the main frame upon the truck mechanisms.

It is of importance in short track machines of the type under consideration and employing an equalizer bar for supporting the weight of the forward end of the main frame upon the trucks to arrange the equalizer bar well forwardly on the main frame in order properly to distribute the weight and also to keep the front ends of the trucks in proper alignment. A point of connection to the rear of the front idler wheel is unsatisfactory as being too far rearwardly. Another plan includes the use of yokes extending out ahead of the idler wheel and receiving the equalizer bar, but such yokes prevent the use of enlarged grousers or shoes. In the present invention, I employ a novel type of idler wheel in the form of a ring mounted revolubly on an annular support, which support is fixed to the truck frame and is cut away centrally to allow the equalizer bar to be connected to the truck frame within the perimeter of the revoluble ring. Such a connection could not be made if the ordinary idler wheel were used. The resulting structure provides a point of connection for the equalizer bar far enough forwardly to evenly distribute the weight of the main frame upon the trucks.

In the accompanying drawings,

Fig. 1 shows a partial plan view of a tractor embodying my invention.

Fig. 3 shows a side elevation of the support for the forward flight of the track illustrating a modification thereof.

Fig. 4 shows a sectional view taken on the line 4—4 of Fig. 3.

Figure 2:
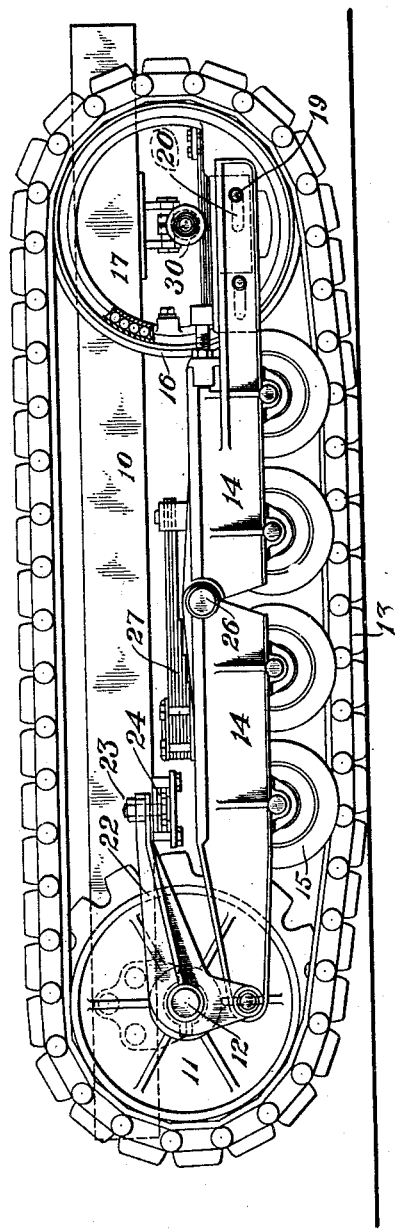
Fig. 2 shows a side elevation of the same.

Referring more in detail to the accompanying drawings, I show a main frame 10 at each side of which is a track laying unit, each unit comprising a driving sprocket wheel 11 journaled on an axle 12 fixed to the main frame and driving an endless track 13. Within the track is a truck mechanism consisting of a frame 14 having a series of rollers 15 journaled thereon and operating upon the ground stretch of the track. At the front of each truck frame is a guide or support for the forward flight of the track in the form of a ring 16 operating upon ball bearings 17 carried in an annular race formed upon a supporting member 18. The latter is fixed to the truck frame by means of bolts 19 working in slots 20 which permit a fore and aft adjustment of the said member 18. For the purpose of moving the supporting member 18 back and forth, I employ a screw threaded rod 21 between the said supporting member 18 and the truck frame.

The rear end of the truck frame is connected pivotally to a yoke-shaped bell-crank lever 22 journaled on the axle 12. The opposite end of the bell-crank yoke has a slot to receive a bolt 23 for connecting it with a leaf spring 24 which latter extends beneath the main frame and connects with the opposite truck, being also connected to a crosssill 24 on the main frame as shown at 25. The truck frame is preferably jointed at 26 and the two parts are held yieldingly in alignment by a cantalever spring 27.

Figure 5:
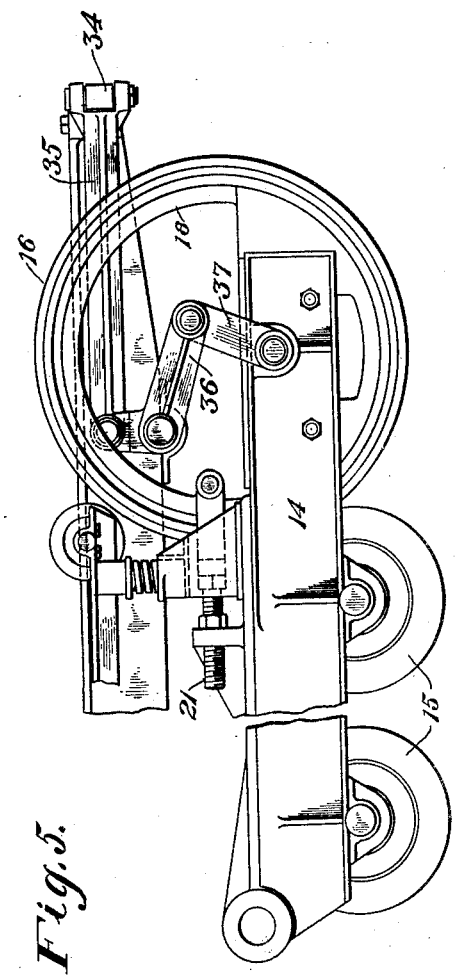
Fig. 5 shows a detail in side elevation of a further modification of the support or guide wheel for each forward flight of the track.

To support the front end of the main frame on opposite trucks, I employ an equalizer bar 28 pivoted at its middle to the main frame as shown at 29 in Figs. 1 and 2 and having a roller 30 at each end riding on a leaf spring 31 mounted within the support 18, the latter being cut away to allow the end of the equalizer to extend therethrough. As shown in Figs. 3 and 4, a rod 32 may be substituted for the spring 31 and a sliding bearing 33 may be substituted for the roller 30.

Where greater clearance is desired between the equalizer bar and the ground, I may employ the connections shown in Fig. 5 where an equalizer bar 34 is arranged at the front of the main frame on a vertical pivot and each end has a link connection 35 with a bell-crank 36 journaled on the main frame a little to the rear of the front thereof. The bell-crank 36 in turn is connected to the truck frame within the perimeter of the revoluble guide 16 by means of a link 37.

All of the forms shown herein include a support member 18 forming an annular track for the ball-bearings which carry the revoluble ring 16, such supporting member being cut away centrally to allow connections to be made within for the equalizer bar.

The bell-crank yoke at the rear forms a thrust connection between the axle and truck frames and is capable of permitting the truck frames to move rearwardly relatively to the sprocket wheels for the purpose of producing slack in the track in case an obstruction becomes lodged between the track and the sprocket or idler wheels.

Various changes in the construction and arrangement of the several parts may be employed without departing from the spirit of my invention as disclosed in the appended claims.

Having thus described my invention, what I claim and desire to secure by Letters Patent is:

1. In a tractor of the self-laying track type, a main frame, a track-laying unit at each side thereof, each unit including a truck frame for supporting the weight of the main frame, an annular supporting member on each truck frame, a ring revolubly mounted on the supporting member and forming a guide for the forward flight of the track, a horizontal member arranged within the annular supporting member and secured thereto, and an equalizer bar pivotally connected with the main frame and having a sliding connection with each of said horizontal members within the annular supporting member.

2. In a tractor of the self-laying track type, a main frame, a track laying unit at each side thereof, each unit including a truck frame for supporting the weight of the main frame, an annular supporting member on each truck frame, a ring revolubly mounted on the supporting member and forming a guide for the forward flight of the track, said supporting member being cut away centrally, an equalizer bar connected with the forward end of the main frame for supporting the weight of the latter, and operative connections between the equalizer bar and the opposite truck frames within the perimeter of the annular support.

3. In a tractor of the self-laying track type, a main frame, a track laying unit at each side thereof including a sprocket wheel journaled on the main frame, an endless track driven by said sprocket wheel, and a truck mechanism within the track for supporting the weight of the main frame, and a thrust connection between the axle of the driving sprocket wheel and the track comprising a bell-crank member journaled on the axle and having one end connected to the frame of the truck mechanism and the other end connected to the main frame, said bell-crank lever being operative to permit the truck mechanism to move rearwardly relatively to the sprocket wheel for the purpose of producing slack in the track.

In testimony whereof I have hereunto set my hand in the presence of two subscribing witnesses.

ELMER E. WICKERSHAM.

Witnesses:
W. W. HEALEY,
JOHN H. HERRING.